United States Patent [19]

Paxton et al.

[11] Patent Number: 5,604,338
[45] Date of Patent: Feb. 18, 1997

[54] TEMPERATURE ADJUSTING LOW PRESSURE SENSOR

[75] Inventors: Donald J. Paxton, Brigham City; Marcus T. Clark, Kaysville; Brian H. Fulmer, Farr West, all of Utah

[73] Assignee: Morton International, Inc., Chicago, Ill.

[21] Appl. No.: 558,358

[22] Filed: Nov. 16, 1995

[51] Int. Cl.$^6$ ................................................ H01H 35/34
[52] U.S. Cl. .................. 200/83 N; 280/735; 337/342; 340/594; 340/605
[58] Field of Search .................... 337/40, 320, 326, 337/327, 332, 333, 342, 362; 200/362.1, 61.54, 61.58 R, 83 R, 83 A, 83 N, 83 W; 340/521, 605, 611, 626, 593, 594; 73/861.47, 717, 723; 280/735, 736, 742; 307/118; 116/266, 268

[56] References Cited

U.S. PATENT DOCUMENTS

| | | | |
|---|---|---|---|
| 3,345,876 | 10/1967 | Smith | 116/266 |
| 3,492,968 | 2/1970 | Workman, Jr. | 116/270 |
| 3,771,121 | 11/1973 | Lohr | 340/52 R |
| 3,818,764 | 6/1974 | Wagner | 73/393 |
| 3,832,662 | 8/1974 | Haven | 337/40 |
| 3,944,769 | 3/1976 | Wagner | 200/83 A |
| 4,049,935 | 9/1977 | Gruber | 200/83 P |
| 4,101,747 | 7/1978 | Hawk | 200/83 A |
| 4,394,033 | 7/1983 | Goetz et al. | 280/736 |
| 5,225,643 | 7/1993 | Marchant | 200/834 |
| 5,296,659 | 3/1994 | Potts et al. | 200/83 J |
| 5,351,527 | 10/1994 | Blackburn et al. | 73/52 |
| 5,356,176 | 10/1994 | Wells | 280/737 |
| 5,360,232 | 11/1994 | Lowe et al. | 280/741 |

*Primary Examiner*—Gerald P. Tolin
*Attorney, Agent, or Firm*—Corinne R. Gorski; Gerald K. White

[57] ABSTRACT

A temperature compensating low pressure sensor for verifying loss of gas from an inflator of a vehicle restraint safety system. The sensor includes a housing and a pressure diaphragm in communication with the fluid in the inflator. A temperature sensitive bimetallic thermostat is disposed within the housing. The thermostat expands with relation to a change in temperature of the fluid at the same rate as the pressure diaphragm. A retainer in communication with the pressure diaphragm is movably disposed in the housing. A stack of spring washers is disposed between the retainer and the thermostat for counteracting the pressure of the fluid acting upon the diaphragm. A contact arm in contact with the thermostat moves with the retainer. When the diaphragm is acted upon by a shift in pressure due to a temperature change of the fluid, the thermostat moves at the same rate as the pressure diaphragm and the contact arm remains in contact with the thermostat, thus avoiding an alarm indication due merely to a drop in pressure related to a temperature change of the fluid.

10 Claims, 2 Drawing Sheets

5,604,338

TEMPERATURE ADJUSTING LOW PRESSURE SENSOR

This application is related to copending application Ser. No. 08/600,844, entitled "Tell-Tale Indicator to Provide Evidence of Gas in an Inflator at the Time of Deployment"; Ser. No. 08/587,615, entitled "Post Deployment Fill Status Indicator"; Ser. No. 08/648,459, entitled "Device for Pressure Release During Bonfire and Tell-Tale of Compressed Gas"; Ser. No. 08/584,903, entitled "Wire-Wrap Low Pressure Sensor for Pressurized Gas Inflators".

BACKGROUND OF THE INVENTION

1. Field of the Invention

The present invention relates to a low pressure sensor for sensing a change in the mass of a gas within a pressure vessel, and more particularly, to a temperature compensating low gas pressure sensor for use in a hybrid inflator of a vehicle safety restraint assembly.

2. Description of the Related Art

Numerous types of inflators have been disclosed in the prior art for expanding an inflatable air bag of a vehicle safety restraint system. One type of inflator utilizes a quantity of high pressure gas stored in a storage cylinder or body, which is selectively released to inflate the air bag. Another type of inflator derives the gas source from a combustible gas generating material, which, upon ignition, generates a quantity of hot gas for inflating the air bag. In still another type, the inflator includes both stored compressed gas and gas generating material for inflating the air bag. Such an inflator is referred to as a hybrid inflator, an example of which is disclosed in U.S. Pat. No. 5,360,232, assigned to the assignee of the present invention.

In a vehicle safety restraint system which partly or solely utilizes stored compressed gas it is very important to monitor the pressurized bottle containing the stored gas to detect any leakage in the container. If the gas pressure of the bottle falls below a predetermined level due to an undetected gas leak, the airbag effectiveness would degrade and the system will not operate properly.

Typically hybrid inflators are filled with compressed argon gas to approximately 3000 psi at 21° C. However, this same volume of gas will diminish to a pressure of 2200 psi at −30° C. and increase to a pressure of 4000 psi at 80° C. Given that normal operating temperatures span such a wide range, compensation for temperature of the gas is a necessary function of a low pressure gas sensor. If such temperature compensation is not included in the low pressure gas sensor, the sensor would signal "low gas pressure" at cold temperatures and would not sense an actual low gas pressure at high temperatures.

It is known to merely detect loss of pressure in a pressurized vessel, with such loss being attributed to a leak in the vessel or other damage to the vessel. See U.S. Pat. Nos. 3,771,121, 4,049,935 and 5,296,659. U.S. Pat. No. 5,225,643, assigned to the assignee of the present invention, discloses a differential pressure switch disposed within a pressurized vessel.

A major disadvantage of the above differential pressure switches is the ineffectiveness for differentiating between a drop in pressure attributed to a change in temperature of the gas or a drop in pressure due to a leak.

U.S. Pat. Nos. 3,818,764 and 3,944,769 disclose pressure sensors which are temperature compensated by charging the sensor reference chambers with the same gas as the inflator. Thus, the switch must be pressurized and this pressurized gas may also leak. Moreover, continuous adjustment of the pressure is required.

U.S. Pat. No. 5,356,176 discloses a complex leakage detecting assembly which generates a signal in response to a change in temperature of the vessel through the use of a plurality of strain gauges and a layered bimetallic disk.

SUMMARY OF THE INVENTION

It is an object of the present invention to overcome the deficiencies of the prior art by providing a low pressure sensor which both senses a change in a mass of a fluid, such as compressed gas, of a pressurized vessel due to a leak in the vessel and compensates for temperature changes of the compressed gas.

Another object of the invention is to provide a low gas pressure sensor which compensates for temperature changes of the compressed gas without utilizing a compressed reference gas chamber.

In accomplishing these and other objectives of the present invention, there is provided a low pressure sensing device for sensing a change in a mass of a fluid of a pressurized vessel including a housing disposed within the pressurized vessel. A pressure diaphragm is attached to the housing in communication with the fluid in the pressurized vessel. A retainer is in contact with the pressure diaphragm and is movably disposed within the housing. A temperature sensitive thermostat is also movably disposed within the housing. The thermostat moves in relation to a change in temperature of the fluid. Contact means provide contact between the diaphragm and the thermostat. Spring means disposed in the housing in communication with the retainer, counteract the movement of the thermostat due to a change in temperature of the fluid, wherein when the diaphragm is acted upon by a shift in pressure due to a temperature change of the fluid, the spring means moves the pressure diaphragm at the same rate as the thermostat to maintain contact between the thermostat and the contact means.

The pressure of the gas is measured by the movement of the pressure diaphragm, however, the bimetallic thermostat compensates for pressure changes due to temperature changes, thus the sensor can indicate a loss in the actual mass of the gas present in the inflator.

Other features and advantages of the present invention will become apparent from the following description of the invention which refers to the accompanying drawings.

DETAILED DESCRIPTION OF THE PREFERRED EMBODIMENT

Figure 1:
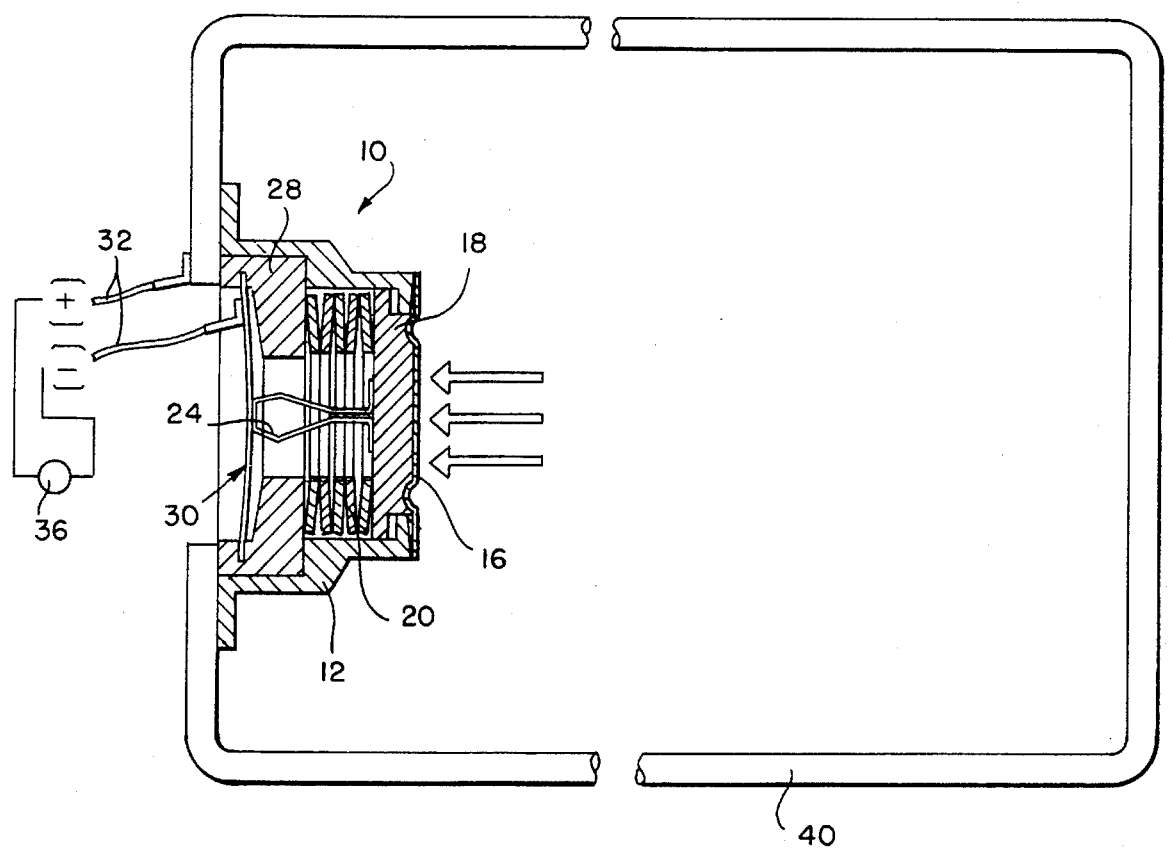
FIG. 1 is a cross-section of the low pressure sensor according to the present invention.

Referring to FIG. 1, in order to verify an undetected gas leak failure, a low pressure sensor (LPS) 10 is installed inside a pressure vessel 40, such as an inflator bottle of a hybrid gas inflator. The low pressure sensor 10 senses a change in the mass of the gas within the vessel 40.

Figure 2:
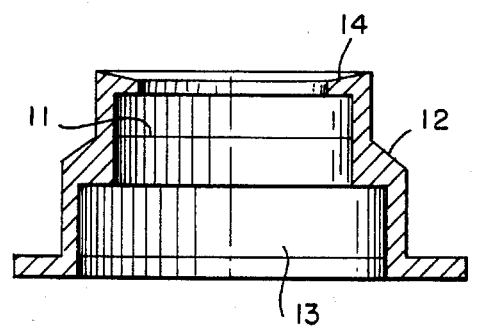
FIG. 2 is a cross-section of the housing of the low pressure sensor of the present invention.

The temperature sensitive low pressure switch of the present invention includes a housing 12, which can, for example, be positioned within the fill port of the bottle. As shown in FIGS. 1 and 2, housing 12 includes an upper chamber 11 for receiving a diaphragm 16, a spring retainer 18, and a stack of spring washers 20, all of which will be described further herein. A lower chamber 13 of housing 12 receives a thermostat holder and spring support 28 and a bimetal thermostat 30, which will also be described further herein.

Figure 3:
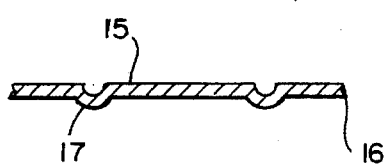
FIG. 3 is a cross-section of the pressure diaphragm according to the present invention.

Referring to FIGS. 1 and 3, diaphragm 16 is made of thin, circular, flexible metal and may include a spherical convolution 17 to maximize the deflection capability of the diaphragm. Diaphragm 16 is also hermetic to allow pressure to build up on one side 15. Pressure diaphragm 16 is attached to the housing 12 at a shoulder 14 by welding or some other hermetic attachment means, and is responsive to the pressure of the fluid in the vessel.

Figure 4:
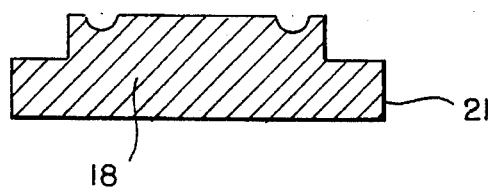
FIG. 4 is a cross-sectional view of the spring backup disc of the low pressure sensor.

Floating backup retainer 18 is positioned between spring washers 20 and diaphragm 16. If the springs 20 and backup retainer 18 were not present, the high pressure would burst the thin pressure diaphragm. Backup retainer 18 floats within the upper portion of chamber 11. As shown in FIG. 4, the upper surface of retainer 18 matches the shape of the pressure diaphragm upon engagement of the retainer and diaphragm. As retainer 18 floats within chamber 11, a lip 21 of the retainer abuts against shoulder 14 of the housing to limit the upward movement of the retainer within the housing.

One of the criteria for choosing a pressure sensor is that it must compensate for temperature variations. The low pressure sensor of the present invention is a temperature sensitive device of a simple, low cost design.

The temperature is compensated for by providing bimetallic thermostat 30 which moves at the same rate as the pressure diaphragm 16, when acted upon by a shift in gas pressure due to a temperature change of the gas. Thermostatic bimetals react to temperature by distorting in relation to the temperature change. Bimetals are available in a variety of materials, thickness' and shapes. The bimetal is designed to allow movement at the same rate the spring compresses and expands with relation to temperature and pressure.

Figure 5:
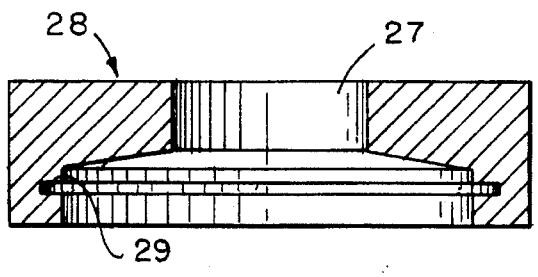
FIG. 5 is a cross-sectional view of the thermostat holder of the present invention.

The thermostat 30 is in the shape of a disc which may be snap fit within the non-conductive thermostat holder 28. As shown in FIG. 5, holder 28 includes a slot 29 into which the edge of thermostat 30 is received. Holder 28 also includes a central opening 27 through which the contact arm extends.

The pressure of the gas acting upon the diaphragm 16 is counteracted by the stack of spring washers 20. It should be appreciated that a standard coil spring can also be used, however, it would have to be large enough to counteract the given pressures. As force pressure increases or decreases against the diaphragm 16, the spring washers 20 compress and expand respectively with the force.

A contact arm 24 is attached electrically, by welding or other known means, to retainer 18. Contact arm extends towards bimetal thermostat 30 such that electrical contact is made between contact arm 24 and bimetal thermostat 30 when there is adequate gas in the inflator.

Figure 6:
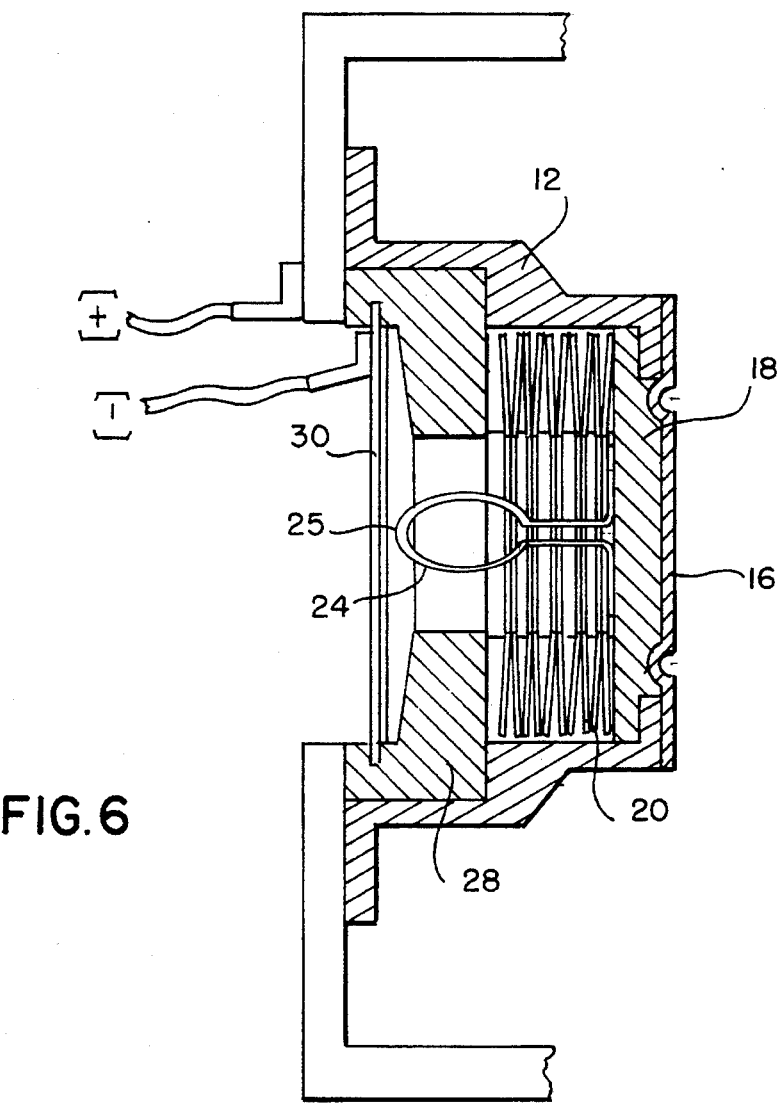
FIG. 6 is a cross-sectional view of the low pressure sensor illustrating a break in contact due to a low pressure condition in a pressurized vessel.

As shown in FIG. 6, when pressure drops due to a gas leak in the vessel, pressure diaphragm 16 will move away, (to the right in FIG. 6), under its own bias, disengaging from retainer 18 which also moves rightwardly and away and from thermostat 30. Contact arm 24 attached to retainer 18, will move away, rightwardly as shown in FIG. 6, breaking contact with thermostat 30. Thus, the circuit opens when pressure is lost to gas leakage. Contact arm 24 is designed such that it's tip 25 will compress and spring back to shape when pushed against the thermostat. This is necessary because there is a requirement to proof test the gas bottle to its maximum expected operating pressure (MEOP). The MEOP occurs at high temperature conditions, usually around 6000 psi at 80° C., and the proof test is performed at ambient temperature (21° C.). Therefore, the diaphragm and contact arm would move during proof testing, while the thermostat would not move. For this reason, the contact arm must be compressible.

Electric leadwires 32 depicted in FIG. 1, demonstrate how the continuity between the contact arm and thermostat could be verified. There are many other possible means of connecting the contact arm and the thermostat. If the pressure drops below a certain threshold, the sensor circuit is broken which triggers an audible alarm or light illumination 36 (FIG. 1), alerting the vehicle operator that the gas pressure has dropped below a proper operating level.

The total movement of the diaphragm with respect to pressure change is governed by the spring washer size, shape, number, material and stacking configuration.

The total flexing of the bimetal thermostat is governed by size, thickness, geometry and material. Given the wide range of possible design parameters, several designs utilizing the present invention are possible. An example of the calculations required to determine an operational diaphragm/spring washer and bimetal thermostat combination is as follows:

In order for the low pressure sensor of the present invention to function properly the thermostat movement (M) must be equal to the spring movement (Y) and can be expressed as:

$$M=Y$$

The thermostat movement is defined as:

$$M=(K_{bimetal} \times \Delta T \times D_{thermostat})/t_{bimetal}$$

where
constant $K_{bimetal}=2.13 \times 10^{-6}$ in./°F. (for ASTM T2 bimetal),
$\Delta T$=temperature change, $D_{thermostat}$=diameter of the thermostat,
and $t_{bimetal}$=thickness of the bimetal thermostat.
The spring movement is defined as:

$$Y=K_{spring} \times \Delta F \times n_{springs}$$

where
constant $K_{spring}=5.9 \times 10^{-6}$ in/lb. (for a spring washer having an outer diameter=0.75 in., an inner diameter= 0.38 in., a thickness of 0.035 in. and a 0.057 in. taper),
$n_{springs}$ number of springs in washer stack, and $\Delta F$=change in force.
The change in force is defined as:

$$\Delta F=P \times A_{diaphragm}$$

where
$\Delta P$=change in pressure and $A_{diaphragm}$=area of the pressure diaphragm.

EXAMPLE

With a pressure diaphragm having a diameter of 0.6 in., a thermostatic disc having a diameter of 0.75 in., $P_{-30°C}=2200$ psi, $P_{+80°C}=4000$ psi, and using 5 springs, the spring and bimetal parameters can be calculated as follows:

$\Delta F = \Delta P \times A_{diaphragm}$ $\Delta F = (4000-2200)$ lb./in$^2 \times 0.283$ in$^2 = 510$ lb.

$Y = K_{spring} \times \Delta F \times n_{springs}$ $Y = 5.9 \times 10^{-6}$ in/lb. $\times 510$ lb. $\times 5$ springs $Y = 0.015$ in.

$M = 0.015$ in.

$$t_{bimetal} = K_{bimetal} \times \Delta T \times D_{thermostat}/M$$

$$= \frac{(2.13 \times 10^{-6} \text{ in/°F.} \times 198° \text{ C.} \times 0.75 \text{ in.})}{0.015 \text{ in.}}$$

$t_{bimetal} = 0.021$ in.

Therefore, given the above, the bimetal thermostat disc should have a thickness of 0.021 in. in order to move at the same rate as the 5 springs.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A temperature compensating low pressure sensing device for sensing a change in a mass of a fluid of a pressurized vessel due to a leak in the vessel, comprising:

a housing disposed within the pressurized vessel;

a pressure diaphragm attached to said housing in communication with the fluid in the pressurized vessel;

a retainer in contact with said pressure diaphragm and movably disposed within said housing;

a temperature sensitive thermostat movably disposed within said housing, said thermostat moving in relation to a change in temperature of the fluid;

contact means for providing contact between said diaphragm and said thermostat; and spring means disposed in said housing in communication with said retainer for counteracting the movement of said thermostat due to a change in temperature of the fluid, wherein when said diaphragm is acted upon by a shift in pressure due to a temperature change of the fluid, said spring means moves said pressure diaphragm at the same rate as said thermostat to maintain contact between said thermostat and said contact means.

2. The low pressure sensing device of claim 1, wherein said contact means comprises a contact arm attached to said retainer and in contact with said thermostat.

3. The low pressure sensing device of claim 2, wherein said housing includes a first and a second chamber.

4. The low pressure sensing device of claim 3, wherein, said retainer and spring means are disposed in said first chamber, and said thermostat is disposed in said second chamber.

5. The low pressure sensing device of claim 3, wherein and said contact arm extends through both said first and second chambers.

6. The low pressure sensing device of claim 3, further comprising a thermostat holder disposed in said second chamber for retaining said thermostat therein.

7. The low pressure sensing device of claim 1, wherein said temperature sensitive thermostat comprises a bimetallic disc.

8. The low pressure sensing device of claim 1, wherein said spring means comprises a plurality of stacked spring washers, wherein movement of said diaphragm with respect to a change in the pressure depends on the size of each spring washer and the number of spring washers.

9. The low pressure sensing device of claim 2, further comprising indicating means for remotely indicating a break in contact between said contact arm and said thermostat due to a loss in pressure which is not due to a change in temperature of the fluid.

10. A temperature compensating low pressure sensing device for sensing a change in a mass of a fluid of a pressurized inflator of a vehicle safety restraint assembly, comprising:

a housing disposed within the pressurized inflator;

a pressure diaphragm attached to said housing in communication with the fluid in the pressurized inflator;

a retainer in contact with said pressure diaphragm and movably disposed within said housing;

a temperature sensitive thermostat movably disposed within said housing, said thermostat moving in relation to a change in temperature of the fluid;

contact means for providing contact between said diaphragm and said thermostat; and spring means disposed in said housing in communication with said retainer for counteracting the movement of said thermostat due to a change in temperature of the fluid, wherein when said diaphragm is acted upon by a shift in pressure due to a temperature change of the fluid, said spring means moves said pressure diaphragm at the same rate as said thermostat to maintain contact between said thermostat and said contact means.

* * * * *

UNITED STATES PATENT AND TRADEMARK OFFICE
CERTIFICATE OF CORRECTION

PATENT NO. : 5,604,338
DATED : Feb. 18, 1997
INVENTOR(S) : Donald J. Paxton, Marcus T. Clark and Brian H. Fulmer It is certified that error appears in the above-indentified patent and that said Letters Patent is hereby corrected as shown below:

At column 4, line 59, "$n_{springs}$ number" should be --$n_{springs}$ = number--.

At column 4, line 63, "$\Delta R = P x A_{diaphragm}$" should be --$\Delta F = \Delta P x A_{diaphragm}$--.

Signed and Sealed this

Seventh Day of October, 1997

Attest:

BRUCE LEHMAN

Attesting Officer

Commissioner of Patents and Trademarks